Patented Dec. 18, 1928.

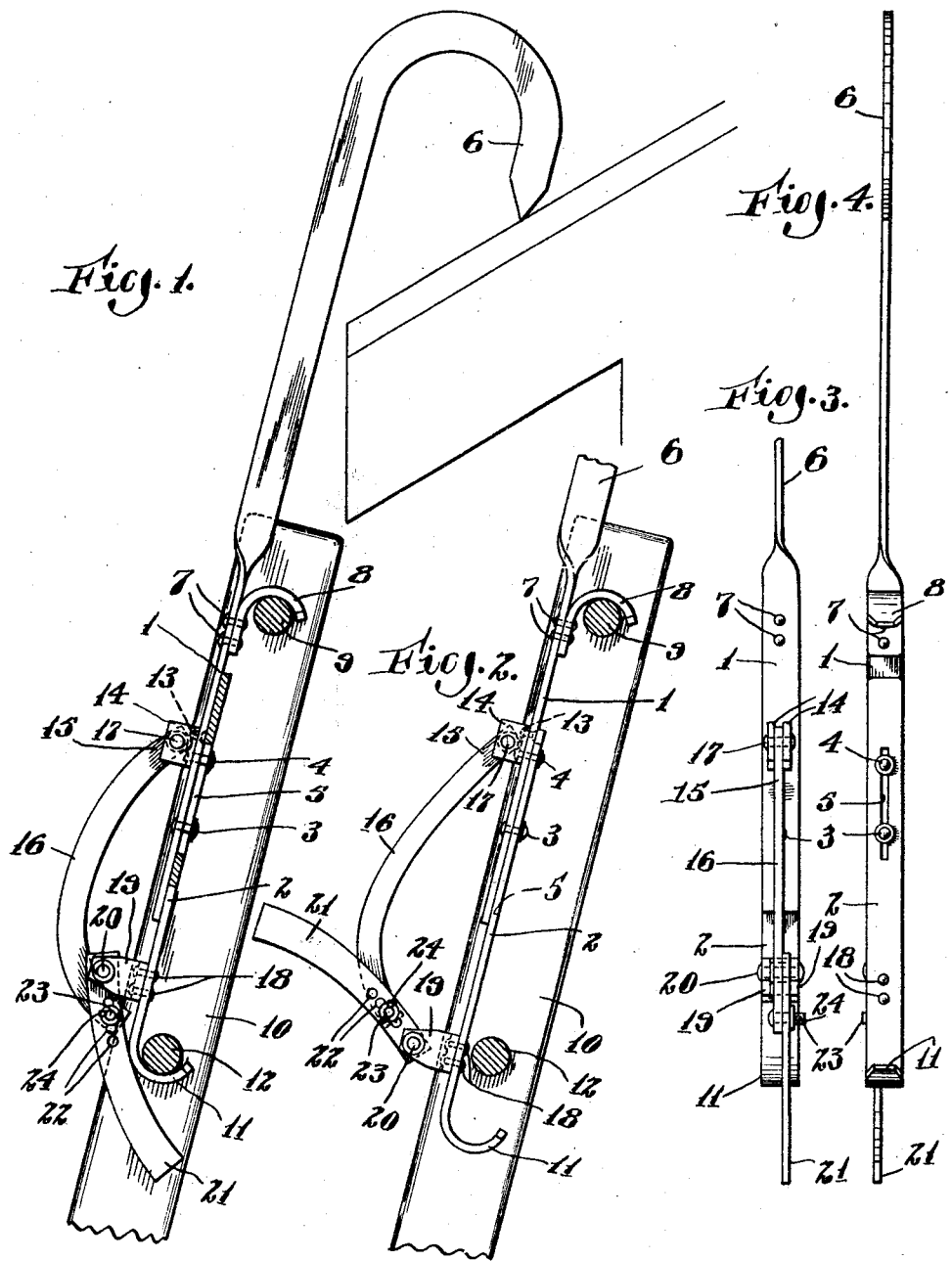

1,695,428

UNITED STATES PATENT OFFICE.

JOSEPH A. JOHNSON, OF WESTON, MASSACHUSETTS.

DETACHABLE HOOK FOR ROOF LADDERS.

Application filed October 25, 1927. Serial No. 228,569.

My invention has numerous objects, the principal of which are the provision of means whereby a ladder-hook may be quickly, easily and securely fixed to or detached from a ladder; may be likewise adjusted, to be detachably secured to various ladders whose rounds are at different distances apart; and of means so formed that its operating parts, when connected to a ladder, allow persons or objects moving over or coming in contact with its said parts, to pass smoothly and uninterruptedly over them without being caught by, and causing them to unlock the roof-hook from the ladder.

Further, my invention is, in structure, simple and strong; few in parts; and is easily and cheaply manufactured.

In the drawings illustrating the principle of my invention, and the best physical structure now known to me, embodying the same, Fig. 1 is a section of a ladder, showing my invention secured thereto;

Fig. 2 is a similar view, the invention hanging on the top round of the ladder, and ready to be locked to, or removed from the ladder; while Figs. 3 and 4 are, respectively, a top and a bottom plan of my invention.

Two members, 1 and 2, Figs. 1, 2 and 4, are longitudinally slidable upon each other, and movably secured together by headed rivets 3, 4, fixed to the member 1 and passed through a longitudinal slot 5, in member 2. The free end portion of the member 1 is formed into a suitable roof hook 6, while to the base of the shank is fixed, by two rivets 7, a small hook 8 to engage, say, the top round 9 of a ladder. The free end portion of the member 2 is bent to form a corresponding but oppositely bent hook 11 to engage an adjacent but lower round 12 of the ladder. To the top portion of member 1, and secured thereto by rivets 4 and 13, is a pair of ears 14 in which is pivoted the end portion 15 of an operating bar 16, by a pin 17 passing through said ears and said bar.

Fixed, by rivets 18, to the top free end portion of member 2, next to the round hook 11, is a pair of ears 19, between which is pivoted by a pin 20, a hand lever 21, through which are a series 22 of adjusting holes, into any one of which a pin 23, on the free end portion of the operating bar 16, may be sprung for the purpose of operatively connecting and disconnecting the operating bar 16 and hand lever 21.

It will be noted that the ears of this pair 19, Fig. 3, are far enough apart to permit the operating bar and the hand lever to lie between them; that the pivot pin 23, connecting the operating bar 16 and the hand lever 21, may pass their dead centre 20, Figs. 1 and 2, just after the two round hooks 8, 11, have firmly gripped the rounds longitudinally; that the exposed outer surfaces of the operating bar and hand lever are convex in curvature, and when in the position shown in Fig. 1, offer no resistance to objects or persons moving over the same.

I will now describe the operation of my invention, it being first assumed that the parts are adjusted to allow the roof-hook 6 to be attached to a standard ladder 10, that is, having its rounds at a definite distance apart, say one foot.

To attach the roof-hook, the appliance is laid upon the top end portion of the ladder, as shown in Fig. 2, the top round hook 8 catching over the top round 9, while the lower member 2 has its lower round hook 11 below said lower round 12. Next, the hand lever 21 is seized, and quickly brought down to the position shown in Fig. 1, the hand lever turning upon its pivot 20, in the ears 19 on the member 2, and also upon its pivot pin 23 in the end portion of the operating bar 16, thereby forcing the member 2 to slide longitudinally along the member 1, and bringing the lower round hook 11 against the lower ladder round 12, and causing the two round hooks 8, 11, to longitudinally grip the rounds 9, 12, with great pressure; but as the hand lever 21 has passed the dead centre 20, the resistance offered by the rounds to the round hooks, tends to move the hand lever still farther past the dead centre, and thus to prevent the hand lever to move oppositely and unlock the roof-hook 6 from the ladder.

To detach the roof-hook, the hand lever 21, as shown in Fig. 1, is raised, as appears in Fig. 2; the lower hook 11 disengages the lower round 12, and the invention may be lifted away from the ladder.

If the ladder is not a standard one, and the adjacent rounds are more or less distance apart, then those of the standard ladder, then, by removing the cotter pin 24, in the pivot pin 23, connecting the hand lever and the operating bar, and by springing the pivot pin into, say, the next hole of the series 22, and replacing the cotter pin 24, the round hooks will become adapted to successively detachably secure the roof-hook to this particular ladder.

As already pointed out, the outside curved surfaces of the hand lever 21 and the operating bar 16 are smooth and offer nothing to resist movements of bodies contacting them, and perchance cause injury to them or cause the hand lever 21 to move the hooks 8, 11, out of locking engagement with the rounds 12, 18, of the ladder.

Having described the structure and operation of my invention, and desiring to protect the same in the broadest manner legally possible,

What I claim is:

1. A detachable hook for roof ladders, comprising two members movably secured together and longitudinally slidable upon each other, one of said members having its free end portion in form of a hook to engage a round of a ladder, the other of said members having its free end portion in the form of a hook to engage a support, as a roof, and a hook to engage another round of the ladder; a hand lever pivoted to one member; and an operating bar pivoted to the other member, and having its free end portion pivotally connected to the hand lever, whereby opposite movements of the hand lever will cause said hook members to slide longitudinally in opposite directions, and engage or disengage said rounds.

2. A detachable hook for roof ladders, comprising two members movably secured together and longitudinally slidable upon each other; one of said members having its free end portion in form of a hook to engage a round of a ladder, the other of said members having its free end portion in the form of a hook to engage a support, as a roof, and a hook to engage another round of the ladder; a hand lever pivoted to one member; an operating bar pivoted to the other member, and having its free end portion pivotally connected to the hand lever, whereby opposite movements of the hand lever will cause said hook members to slide longitudinally in opposite directions, and engage or disengage said rounds, said lever and said operating bar and their pivot being so designed and located that the hand lever, in moving the hook members into engagement with the round of the ladder, causes the pivotal connection between the hand lever and the operating bar, to pass by their dead centre, and thereby securely lock the detachable hook to the ladder.

In testimony whereof I hereunto affix my signature.

JOSEPH A. JOHNSON.